United States Patent

[11] 3,555,285

[72] Inventor Robert Irving
 Northridge, Calif.
[21] Appl. No. 546,371
[22] Filed Apr. 29, 1966
[45] Patented Jan. 12, 1971
[73] Assignee The Bunker-Ramo Corporation
 Stamford, Conn.
 a corporation of Delaware

[54] CODED ARRANGEMENT OF PHOTOCELLS MOUNTED ON RIGID BODY TO DETERMINE POSITION THEREOF
10 Claims, 8 Drawing Figs.

[52] U.S. Cl. ............................................. 250/220
[51] Int. Cl. ............................................. H01j 39/12
[50] Field of Search ................................. 250/229,
 230, 231, 221, 203, 211; 88/14A, 14EH

[56] References Cited
UNITED STATES PATENTS
2,952,779 9/1960 Talley ........................... 250/203
3,154,688 10/1964 Shepherd ....................... 250/216
3,243,594 3/1966 Lovell et al. .................... 250/211
3,311,749 3/1967 Briggs ............................ 250/209
2,346,031 4/1944 Jones et al. .................... 88/14EH
2,934,755 4/1960 Canada .......................... 88/14A
2,982,859 5/1961 Steinbrecker .................. 88/14A OTHER REFERENCES
"Fortune", October 1951, pp. 120— 123

Primary Examiner—Ralph G. Nilson
Assistant Examiner—Martin Abramson
Attorney—Frederick M. Arbuckle ABSTRACT: A system capable of precisely determining the instantaneous geometrical relationship between two or more elements of a large substantially rigid structure, which elements may nevertheless exhibit small amounts of movement relative to one another. The geometrical relationship is determined by focusing light from a source fixed to one of the elements on an encoding sensor also fixed to one of the elements to thus generate digitally encoded signals representative of the position of the light incident on the sensor.

INVENTOR.
ROBERT IRVING

INVENTOR.
ROBERT IRVING
BY Arthur Freilich
ATTORNEY

CODED ARRANGEMENT OF PHOTOCELLS MOUNTED ON RIGID BODY TO DETERMINE POSITION THEREOF

This invention relates generally to apparatus for measuring small amounts of relative movement between portions of a substantially rigid structure and is particularly useful for precisely determining the instantaneous geometric relationships between elements of large structures, such as antenna structures.

Increased interest in tracking of and telemetry from long range vehicles and investigation of ever fainter radio stars have led to increased requirements for accurate angular positioning of large steerable antennas for both pointing and tracking. "Pointing" involves placing the axis of an antenna within prescribed angular limits of a given target. "Tracking" involves the determination of the position of a given target to prescribed angular accuracy. Radar systems normally are concerned with tracking, but deep space telemetry systems (which are power limited) are primarily concerned with pointing.

Several recent examples can be cited where the construction specifications for an antenna required angular accuracy of a very precise nature. For example, a 120-foot-high antenna just completed was required to have a pointing precision of 18 arc seconds. In another installation, a 210-foot-deep space antenna required a pointing precision of approximately 1 arc minute.

With today's technology and available structural materials it is impossible to produce rigid bodies of the sizes indicated so as to meet such angular accuracy requirements. Weight and elasticity inherent in the structure itself preclude the brute force construction of devices so large and so rigid. Therefore, it becomes essential to tolerate the small amounts of relative rotation and translation between elements of the structure and to compensate for such variations in geometry by modifying any calculations which are based upon the structure's orientation.

In view of the foregoing, it is an object of the present invention to provide a system capable of precisely determining the instantaneous geometrical relationship between two or more elements which are subject to small amounts of movement relative to one another.

Briefly, in accordance with the present invention, the geometrical relationship between two elements is determined by focusing light from a source fixed to one of the elements on a sensor also fixed to one of the elements. A change in the geometrical relationship between the two elements is indicated by a change in the position of the light incident on the sensor.

In accordance with one embodiment of the invention, the source and sensor are located on the same structural element, with a reflector being provided on the other element for focusing the source light on the sensor. In accordance with an alternate embodiment of the invention, the source and sensor are located on different elements. An important characteristic of all of the embodiments, however, is that they are able to measure both relative rotation and relative translation between the two elements.

Another important aspect of the invention resides in the use of a linear sensor comprised of a plurality of light sensitive elements which are arranged to provide a unique digital output code of each of several different positions that the light can assume relative to the sensor. Moreover, the light sensitive elements are preferably arranged to define a Gray Code so as to reduce the likelihood of ambiguities occurring where the incident light may be slightly skewed relative to the sensor orientation.

The novel features that are considered characteristic of this invention are set forth with particularity in the appended claims. The invention will best be understood from the following description when read in connection with the accompanying drawings, in which:

Figure 4:
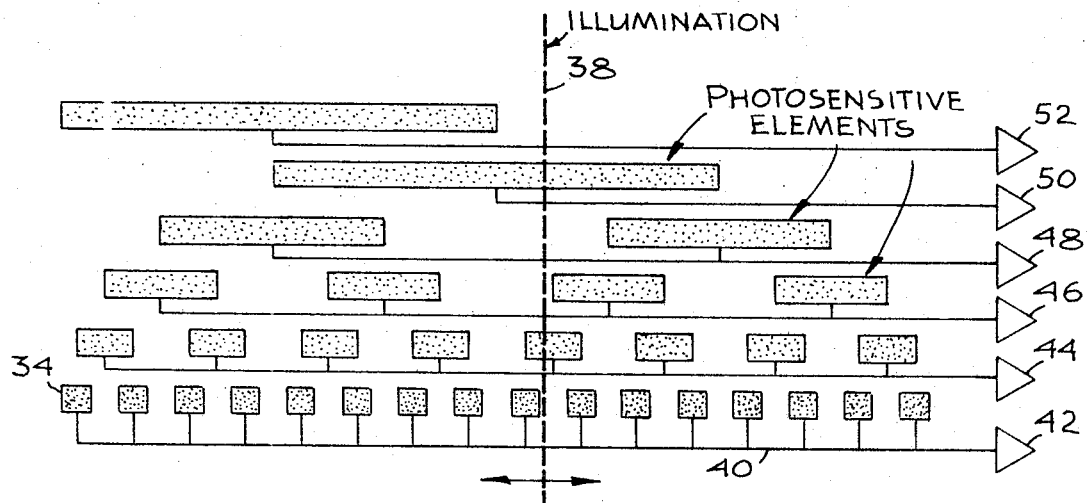

FIGS. 3(a) through 3(e) illustrate various embodiments of the embodiments of the invention; and FIG. 4 schematically illustrates a linear sensor in accordance with a preferred embodiment of the invention.

Figure 1:
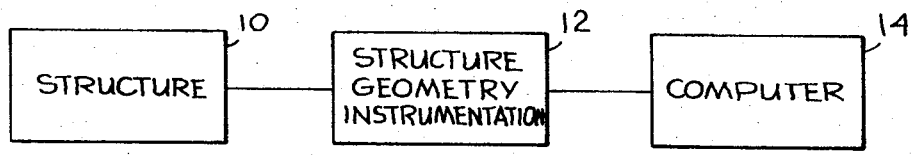
FIG. 1 is a block diagram generally illustrating a system in accordance with the present invention.
Figure 2:
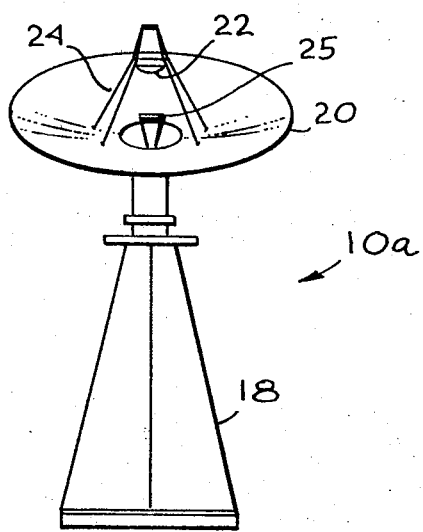
FIG. 2 is a structural diagram illustrating a typical antenna structure with which the invention can be advantageously utilized.

Attention is now called to FIG. 1 of the drawings, which illustrates a block diagram of a system which can incorporate the teachings of the present invention. More particularly, FIG. 1 illustrates a structure 10 which can comprise a large antenna structure 10a (for example, as shown in FIG. 2) including a plurality of elements or structural portions which, due to various factors such as weight, wind, temperature change, etc., can exhibit translation and rotational movement relative to each other. In accordance with the present invention, a structure geometry instrumentation system 12 is provided for measuring the instantaneous geometrical relationships between critical portions of the structure 10. Data representing these measurements is supplied to a digital computer 14 which utilizes the data to compensate for the geometrical variations in calculations involving data representing the true position of the structure relative to some reference, such as a true north or the like.

A typical application of a system in accordance with the invention is in the control of an antenna structure 10a such as shown in FIG. 2. The antenna structure 10a is comprised of a tower 18 supporting a parabolic dish 20 having a hyperbolic reflector 22 supported in spaced relationship therefrom by structural members 24. As previously noted, in many current applications, it is essential to position the antenna to an accuracy of a few arc seconds. When striving for angular accuracy of a few arc seconds, it becomes apparent that the elasticity of large structures such as shown in FIG. 2 makes them stretch and bend almost as if they were made of rubber. The supporting tower 18 tilts and twists, servosystems lag and hunt, the parabolic dish 20 folds and flutters, and the support structure 24 sags and vibrates, all reacting to gravity, wind, temperature changes, and tracking accelerations. To achieve either tracking accuracy or pointing accuracy, it is necessary to determine the effect on the position of the radio frequency axis (i.e., the axis of the parabolic dish 20) in space of all of these deflections. For tracking, the output of the shaft encoders (not shown) utilized to indicate the position of the parabolic dish 20 is modified to indicate the position of the target as the sum of the radio frequency axis position plus the target offset from this axis. For pointing, the beam position may be adjusted to the desired location in space by slewing the hyperbolic reflector 22 or the feed horn 25.

In accordance with the present invention, in order to obtain data representing the instantaneous geometrical relationships between various portions of the structure shown in FIG. 2, various embodiments of the invention comprising different basic instrument configurations are provided, as shown in FIGS. 3(a)—3(e). In FIGS. 3(a)—3(e) and in the equations pertaining thereto, the various quantities utilized are defined as follows:

$\Theta_1$ = rotation of left-hand unit with respect to an arbitrary index about an axis perpendicular to the page, clockwise rotation is positive.

$\Theta_2$ = rotation of right-hand unit with respect to an arbitrary index about an axis perpendicular to the page, clockwise rotation is positive.

$L_{12}$ = relative displacement of the left-hand unit with respect to the right-hand unit, left unit closer to top of page is positive.

M = linear reading on sensor with respect to an arbitrary index, displacement toward top of page is positive.

R = spacing between right and left units.

r = focal length of imaging optics.

Figure 3:
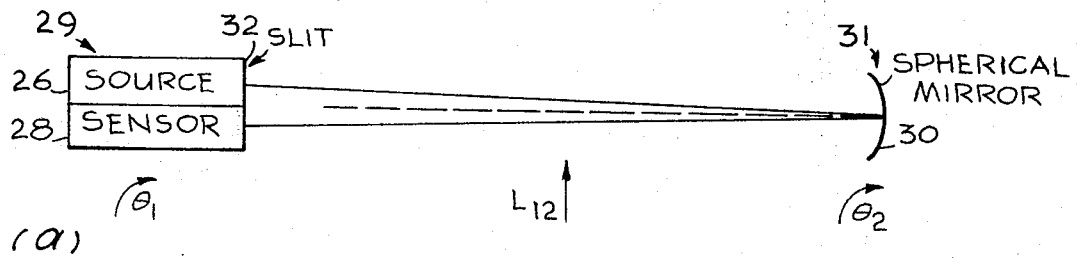
Figure 3:
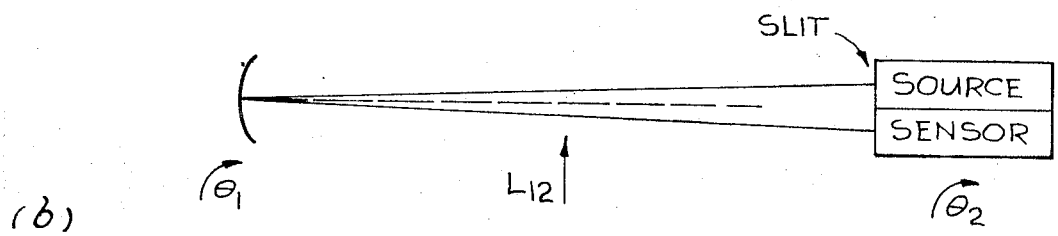
Figure 3:
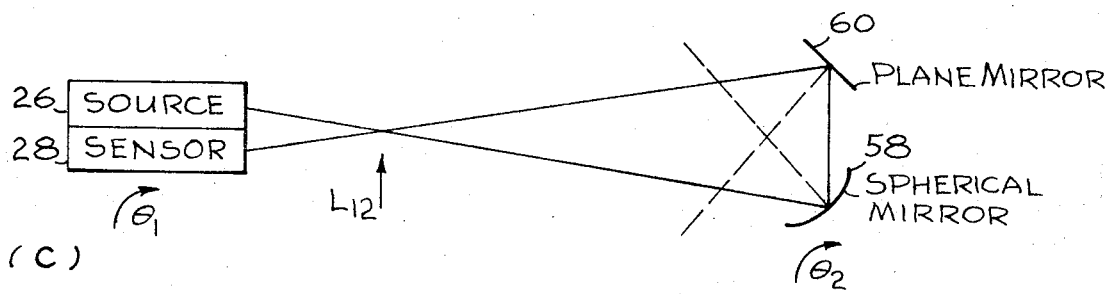
Figure 3:
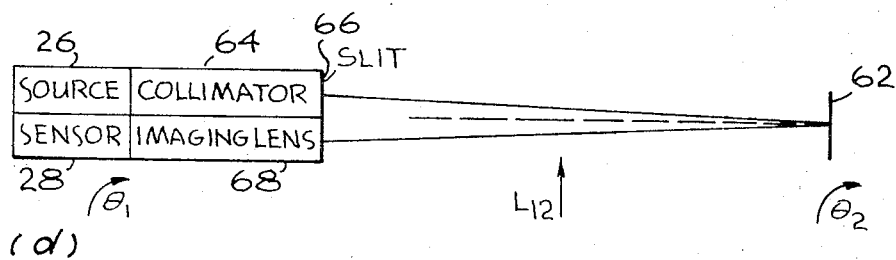
Figure 3:
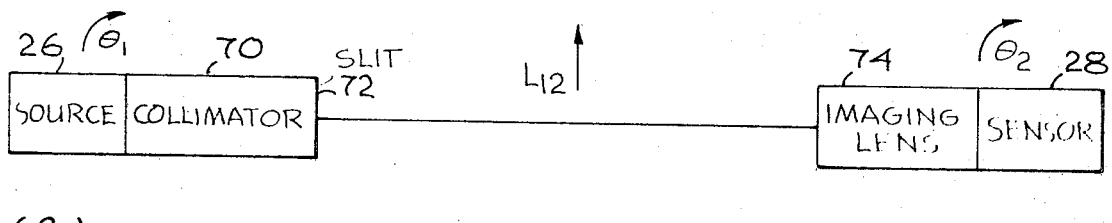

Initially considering the embodiment of FIG. 3(a), it is to be noted that a source 26 and a sensor 28 (comprising a left-hand unit 29) are positioned adjacent each other on a first portion of a structure, with a spherical mirror 30 (comprising the right-hand unit 31) being positioned opposite to the source and sensor on a second portion of the structure. The source 26 comprises a light source which preferably provides coherent light as would be available from a laser. However, the light source 26 can be a noncoherent light source e.g., an incandescent bulb) having a slitted mask 32 interposed between it and the spherical mirror 30. As will be seen more clearly hereinafter, it is only essential that the source 26 and mask 32 define a sharp line of light for reflection by the spherical mirror 30 against the sensor 28.

Preferably, the sensor 28 is comprised of a plurality of light sensitive elements 34 arranges in rows and columns, as is illustrated in FIG. 4. More particularly, FIG. 4 illustrates a linear digital sensor in which the six rows represent different degrees of significance of digital codes produced by the sensor. More particularly, the bottom row of light sensitive elements 34 can be considered as being the least significant, the top row as being the most significant, and the intermediate rows, of course, as being of intermediate significance.

In the utilization of the embodiment of the invention shown in FIG. 3(a), the source 26 and slitted mask 32 focus a line of light on the spherical mirror 30, which is reflected to the sensor in the form of a line image 38, as shown in FIG. 4. If the quantities $L_{12}$ or $\Theta_2$, as shown in FIG. 3(a) are varied, the line image 38 will sweep across the light-sensitive elements 34, moving parallel to the rows of elements. It can be noted that the light-sensitive elements 34 are so arranged in FIG. 4 that for each of several different positions of the image 38, it will intersect unique combinations of light-sensitive elements. For example, when the image 38 is at the extreme left of the diagram, light will be incident on the light-sensitive elements in the bottom and top rows of light-sensitive elements. On the other hand, when the image 38 is at the extreme right of he sensor, light will be incident only on the elements 34 in the bottom row. Similarly, for each of several different positions (63 different columnar positions are shown in FIG. 2), the image will overlay a unique combination of rows of light-sensitive elements 34.

The light-sensitive elements 34 in each row are connected in common to an amplifier. Thus, the light-sensitive elements in the bottom row are all connected to conductor 40, which is connected to the input of amplifier 42. Similarly, each of the other rows of light-sensitive elements are connected respectively to amplifiers 44, 46, 48, 50, and 52. It should be apparent that the output signals provided by the amplifiers 42—52 are representative of the position of the image 38 with respect to the light-sensitive elements 34.

Although the sensor of FIG. 4 has six rows, thereby enabling 63 different codes to be defined to indicate 63 different positions of the image 38, a fewer or greater number of levels could be provided as required. As an example, it is pointed out that an eight-level code can provide precision of better than 1 in 255, or approximately .4 percent. It is also to be noted that the light-sensitive elements 34 are arranged in FIG. 4 in accordance with a Gray Code. As is well known in the art, Gray Codes have the characteristic that only one bit of the code changes at a time. This is important in that it permits minor skew misalignments of the image 38 to be tolerated without introducing coding errors. It is also important to note in FIG. 4 that the image 38 is sufficiently long to exceed both the top and bottom rows of light-sensitive elements. Accordingly, the sensor 28 will not be sensitive to vertical movement of the image 38, as shown in FIG. 4, but will only be responsive to movements of the image parallel to the rows of light-sensitive elements.

Returning now to a consideration of the embodiment of FIG. 3(a), it should be recognized that with the source 26 and sensor 28 located as shown opposite the spherical mirror 30, rotation of the structural portion on which the source and sensor are mounted (i.e., a variation in angle $\Theta_1$) will not give rise to an output change from the sensor 28. This should be apparent in as much as changes in the angle $\Theta_1$ will merely move the light image along the spherical mirror 30, but will not change the relative position of the image on the sensor 28. However, relative translation between the structural portion on which the source and sensor are mounted and the portion on which the spherical mirror is mounted (i.e., a change in quantity $L_{12}$) will tend to sweep the image 38 along the sensor parallel to the rows of light-sensitive elements thereof. This will, of course, give rise to a change in the output code provided by the sensor amplifiers. Similarly, rotation of the structural portion on which the spherical mirror 30 is mounted relative to the portion on which the source and sensor are mounted will tend to move the image 38 along the rows of light-sensitive elements. source and sensor are mounted will tend to move the image 38 along the rows of light-sensitive elements.

The relationship between the quantities $L_{12}$ and $\Theta_2$ and the reading provided by the sensor amplifiers for the configuration of FIG. 3(a) is represented by the equation $$M = 2(\Theta_2 R - L_{12})$$

The derivation of this equation includes certain approximations which assure a high level of accuracy where the arc tangent of the quantity $\dfrac{M}{2R}$ is less than 10 mr.

FIG. 3(b) illustrates an instrument configuration similar to that shown in FIG. 3(a). In the configuration of FIG. 3(b), variations in the angle $\Theta_2$ are not significant, but variations in the angle $\Theta_1$ are. The equation describing the output of the sensor is:

$$M = 2(L_{12} - \Theta_1 R)$$

In the embodiment of FIG. 3(c), the source 26 and sensor 28 are fixed together at one location, off the axis of a spherical mirror. It will be noted that in the embodiments of FIGS. 3(a) and 3(b), the source and sensor were located on the axis of the spherical mirror 30. In the embodiment of FIG. 3(c), the light provided by the source 26 is focused on a spherical mirror 58, which reflects the light to a plane mirror 60, which in turn reflects the light back to the sensor 28. The plane mirror 60 is fixed relative to the spherical mirror 30. In this configuration, an aperture is required at the source. The image of the aperture is distorted into a linear image at the sensor due to the astigmatic effect of the spherical mirror of the axis. Curvature of the spherical mirror is either greater than or less than R, depending upon inclination relative to the sensor axis. The equation for the configuration shown in FIG. 3(c) is identical to that for the configuration shown in FIG. 3(a). It should also be apparent that a configuration utilizing a plane mirror with the source and sensor off the axis of the spherical mirror can be provided corresponding to the configuration of FIG. 3(b).

Attention is now called to FIg. 3(d), which illustrates the source 26 and sensor 28 fixed together at one location, on the axis of a plane mirror 62 fixed at a second location. In this configuration, the light source 26 is collimated by collimator 64 and passed through a slitted mask 66, with the slit extending ran transverse to the measurement axis of he sensor. The slit is focused on the sensor by imaging optics 68. It should be apparent that utilization of the plane mirror 62 in the embodiment of FIG. 3(d) makes the output of the sensor independent of translation $L_{12}$. The equation describing the configuration of FIG. 3(d) is as follows:

$$M = 2(\Theta_2 - \Theta_1)r$$

In the embodiment of FIG. 3(e), the source 26 is at one location, while the sensor 28 is at a second location. A collimator 70 and slitted mask 72 are provided in front of the source 26. An imaging lens 74 is provided in front of the sensor 28. It should be apparent that as long as the translation $L_{12}$ is not excessive i.e., as long as the linear image extends beyond the top and bottom rows of light sensitive elements, then the output of the sensor 28 in the configuration of Fig. 3(e) will be independent of the translation $L_{12}$. More particularly, the equation expressing the output of the sensor 28 in the configuration of FIG. 3(e) is as follows:

$$M = (\theta_2 - \theta_1)r$$

This equation is accurate where the arc tangent of the quantity M/R is less than 10 mr. and the arc tangent of the quantity $L_{12}/R$ is also less than 10 mr.

Examination of the foregoing embodiments reveals that configurations shown in FIGS. 3(a), (b), and (c) respond to a combination of relative motions of the left and right units (transverse to the line of sight between them), and the relative rotation of the spherical mirror unit, at the same time being insensitive to rotation of the source/sensor unit. Configurations shown in FIGS. 3(d) and 3(e) respond to angular rotation of both left and right units, but are insensitive to translation $L_{12}$. By choosing a proper combination, e.g., the configuration of FIG. 3(a) and FIG. 3(d), it is possible to determine both rotation and translation of the right unit with respect to the left unit.

From the foregoing, it should be appreciated that a system has been disclosed herein for determining small amounts of translation and rotation of one portion of a structure relative to another. As indicated, the invention is exceedingly useful in antenna-type and other structures where precise positioning is required. The data obtained representing the amount of rotation and translation can be utilized in the calculations performed by the computer in order to compensate for these geometrical variations.

I claim:

1. In combination with a substantially rigid structure including at least to portions capable of exhibiting translational or rotational movement relative to each other, a system for measuring and quantitatively indicating the positions of said portions relative to one another, said system comprising:

sensor means responsive to a light image incident thereon for providing digitally encoded signals representing the position of said light image relative to said sensor means, said sensor means comprising a plurality of light-sensitive elements arranged in rows and columns, each column of said light-sensitive elements containing elements in a unique combination of rows;

means fixedly mounting said sensor means on one of said portions; and source means fixedly mounted on one of said portions for imaging a line of light of said sensor means extending substantially parallel to said columns.

2. Apparatus suitable for use with a substantially rigid structure including at least two portions capable of exhibiting translational or rotational movement relative to each other for measuring the amount of such movement, said apparatus comprising:

a sensor means adapted to fixedly mounted on one of said portions and responsive to a radiant energy image incident thereon for providing digitally encoded signals representing the position of incidence of said radiant energy image on said sensor means, said sensor means including a plurality of radiant energy detectors arranged in a plurality of substantially parallel rows; and a source means adapted to be fixedly mounted on one of said portions for imaging a sharply defined line of energy on said sensor means extending across said rows substantially perpendicular thereto.

3. The apparatus of claim 2 wherein said plurality of radiant energy detectors are disposed so that said line image intersects a unique set of detectors for each of several different positions extending along said rows.

4. The apparatus of claim 3 wherein all of said radiant detectors common to a single row are connected in common; and wherein said detectors are arranged in accordance with a Gray code whereby the number of said detectors intersected by said line image will differ by only one between any two successive positions extending along said rows.

5. The apparatus of claim 2 wherein said source means and said sensor means are both adapted to be fixedly mounted on one of said two portions; and including a reflector means adapted to be fixedly mounted on the other of said two portions.

6. The apparatus of claim 5 wherein said reflector means comprises a spherical mirror.

7. The apparatus of claim 6 wherein said reflector means comprises a planar mirror.

8. The system as defined by claim 1 including means for electrically interconnecting all of the light sensitive elements in a single row.

9. The system as defined by claim 1 wherein said sensor and source means are both mounted on a first of said portions; and reflector means mounted on a second of said portions.

10. The system as defined by claim 1 wherein said sensor and source means are respectively mounted on different ones of said portions.